(12) United States Patent
Sun et al.

(10) Patent No.: US 9,886,225 B2
(45) Date of Patent: Feb. 6, 2018

(54) PRINTING SYSTEM, AND RECORDING MEDIUM THEREFOR, THAT ENABLE ONE IMAGE FORMING APPARATUS TO EXECUTE INSTRUCTION EXECUTION TYPE PRINT JOB SPOOLED IN ANOTHER IMAGE FORMING APPARATUS

(71) Applicant: Kyocera Document Solutions Inc., Osaka (JP)

(72) Inventors: Zhenyu Sun, Osaka (JP); Masafumi Sato, Osaka (JP); Tatsuya Hiwatari, Osaka (JP); Yoshio Inoue, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/469,524

(22) Filed: Mar. 25, 2017

(65) Prior Publication Data

US 2017/0277491 A1 Sep. 28, 2017

(30) Foreign Application Priority Data

Mar. 25, 2016 (JP) ................... 2016-061303

(51) Int. Cl.
*G06F 3/12* (2006.01)
*H04N 1/00* (2006.01)
*H04N 1/32* (2006.01)

(52) U.S. Cl.
CPC .......... *G06F 3/1238* (2013.01); *G06F 3/126* (2013.01); *G06F 3/1222* (2013.01); *G06F 3/1253* (2013.01); *G06F 3/1267* (2013.01); *G06F 3/1285* (2013.01); *G06F 3/1288* (2013.01); *H04N 1/0097* (2013.01); *H04N 1/00344* (2013.01); *H04N 1/00973* (2013.01); *H04N 1/32523* (2013.01); *H04N 2201/0094* (2013.01); *H04N 2201/3205* (2013.01)

(58) Field of Classification Search
None
See application file for complete search history.

(56) References Cited

U.S. PATENT DOCUMENTS 6,130,757 A * 10/2000 Yoshida ............. H04N 1/00915
358/1.14
9,013,746 B2 * 4/2015 Saitoh ................... G06F 3/1285
358/1.13

(Continued)

FOREIGN PATENT DOCUMENTS

JP 2015-058555 A 3/2015

*Primary Examiner* — Andrew H Lam
(74) *Attorney, Agent, or Firm* — James Judge

(57) ABSTRACT

A printing system includes a plurality of print apparatuses each including a CPU, a storage device including a job management program, and a display. The display displays a list screen, into which a first list of instruction execution type print jobs received from another of the plurality of print apparatuses and a second list of the instruction execution type print jobs of a logged-in user among the instruction execution type print jobs spooled in the storage device are combined on the display In the other of the plurality of print apparatuses, if status change of spooling of the logged-in user's instruction execution type print job has occurred, the print apparatus is notified of the status change of spooling from the other of the plurality of print apparatuses to update the list screen displayed on the display.

6 Claims, 9 Drawing Sheets

(56) References Cited

U.S. PATENT DOCUMENTS

| | | | |
|---|---|---|---|
| 9,098,220 B2* | 8/2015 | Kikuchi | G06F 3/122 |
| 9,299,018 B2* | 3/2016 | Maki | G06F 3/1222 |
| 2007/0177196 A1* | 8/2007 | Maeda | H04N 1/00 358/1.15 |
| 2015/0301773 A1* | 10/2015 | Minagawa | G06F 3/1222 358/1.13 |
| 2017/0060502 A1* | 3/2017 | Ikeda | G06F 3/1238 |

* cited by examiner

PRINTING SYSTEM, AND RECORDING MEDIUM THEREFOR, THAT ENABLE ONE IMAGE FORMING APPARATUS TO EXECUTE INSTRUCTION EXECUTION TYPE PRINT JOB SPOOLED IN ANOTHER IMAGE FORMING APPARATUS

INCORPORATION BY REFERENCE

This application is based upon, and claims the benefit of priority from, corresponding Japanese Patent Application No. 2016-061303 filed in the Japan Patent Office on Mar. 25, 2016, the entire contents of which are incorporated herein by reference.

BACKGROUND

Unless otherwise indicated herein, the description in this section is not prior art to the claims in this application and is not admitted to be prior art by inclusion in this section.

There is known a typical printing system that transmits an instruction execution type print job to a print apparatus from an electronic device.

SUMMARY

A printing system according to one aspect of the disclosure includes a plurality of print apparatuses. The plurality of print apparatuses each includes: a central processing unit (CPU); a storage device storing a job management program; and a display. The CPU executes the job management program to function as: a job spooling unit that spools in the storage device, an instruction execution type print job as a print job executed in response to a specific instruction for each of users; a login accepting unit that accepts a login of a user; a list display that displays a list of instruction execution type print jobs for a logged-in user; and a job execution unit that executes the instruction execution type print job designated in the list. The list display: (i) when the login of the user has been accepted by the login accepting unit, opens a communication channel associated with identification information for the logged-in user, with another of the plurality of print apparatuses; (ii) transmits the identification information for the logged-in user to the other of the plurality of print apparatuses via the communication channel; (iii) requests to the other of the plurality of print apparatuses, a first list of the instruction execution type print jobs of the logged-in user among the instruction execution type print jobs spooled in the other of the plurality of print apparatuses; (iv) displays a list screen into which a second list of the instruction execution type print jobs of the logged-in user among the instruction execution type print jobs spooled in the storage device and the first list received from the other of the plurality of print apparatuses are combined on the display; (v) is notified of status change of spooling of the logged-in user's instruction execution type print job from the other of the plurality of print apparatuses, when the status change of spooling of the logged-in user's instruction execution type print job has occurred in the other of the plurality of print apparatuses; and (vi) updates the list screen displayed on the display.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
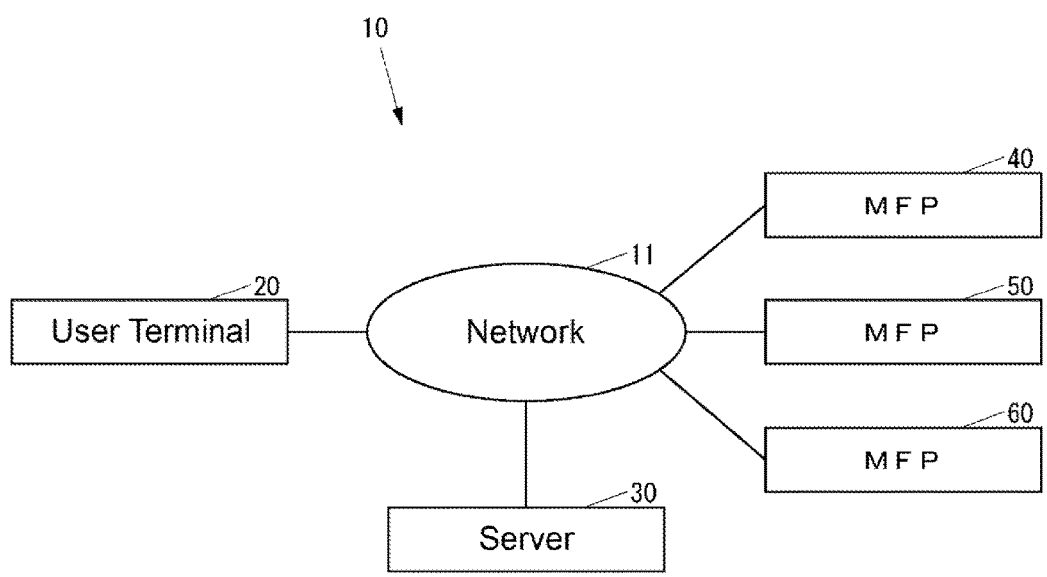
FIG. 1 illustrates a block diagram of a printing system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the drawings.

First, the following describes a configuration of a printing system according to the embodiment.

FIG. 1 illustrates a block diagram of a printing system 10 according to the embodiment.

As illustrated in FIG. 1, the printing system 10 includes a user terminal 20 as an electronic device that creates print data, a server 30, and multifunction peripherals (MFPs) 40, 50, and 60 as print apparatuses that execute print jobs. The user terminal 20, the server 30, the MFP 40, the MFP 50, and the MFP 60 are communicable with one another via a network 11 such as a local area network (LAN) or the Internet.

The MFPs 50 and 60 each have a configuration similar to the MFP 40.

The printing system 10 can include at least one user terminal similar to the user terminal 20 in addition to the user terminal 20. Similarly, the printing system 10 can include at least one MFP similar to the MFP 40 in addition to the MFPs 40, 50, and 60.

Figure 2:
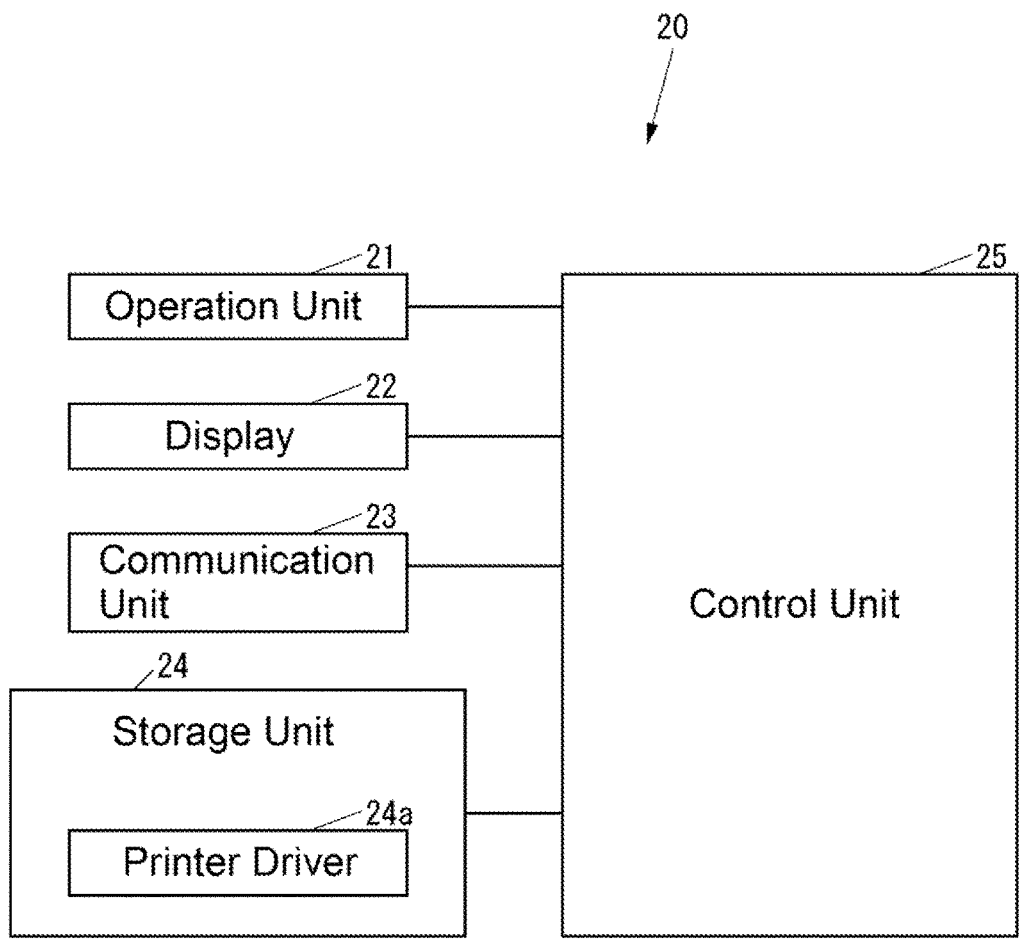
FIG. 2 illustrates a block diagram of a user terminal according to the one embodiment.

FIG. 2 illustrates a block diagram of the user terminal 20.

As illustrated in FIG. 2, the user terminal 20 includes an operation unit 21, a display 22, a communication unit 23, a storage unit 24, and a control unit 25. The operation unit 21 is an input device with which a user inputs various kinds of operations. The display 22 is a display device such as a liquid crystal display (LCD) that displays various kinds of information. The communication unit 23 is a communication device that communicates with an external device via the network 11 (see FIG. 1). The storage unit 24 is a non-volatile storage device such as a semiconductor memory or a hard disk drive (HDD) that stores various kinds of data. The control unit 25 controls the entire user terminal 20. The user terminal 20 includes a portable terminal such as a smart phone, or a computer such as a personal computer (PC).

The storage unit 24 stores a printer driver 24a that creates print data to transmit it as a print job. The printer driver 24a may be installed in the user terminal 20 at production stage of the user terminal 20, may be additionally installed in the user terminal 20 from an external storage medium such as a universal serial bus (USB) memory, or may be additionally installed in the user terminal 20 from the network 11.

The control unit 25 includes, for example, a central processing unit (CPU), a read only memory (ROM), and a random access memory (RAM). The ROM stores programs and various kinds of data. The RAM is used as a work area of the CPU. The CPU executes the programs stored in the ROM or the storage unit 24.

Figure 3:
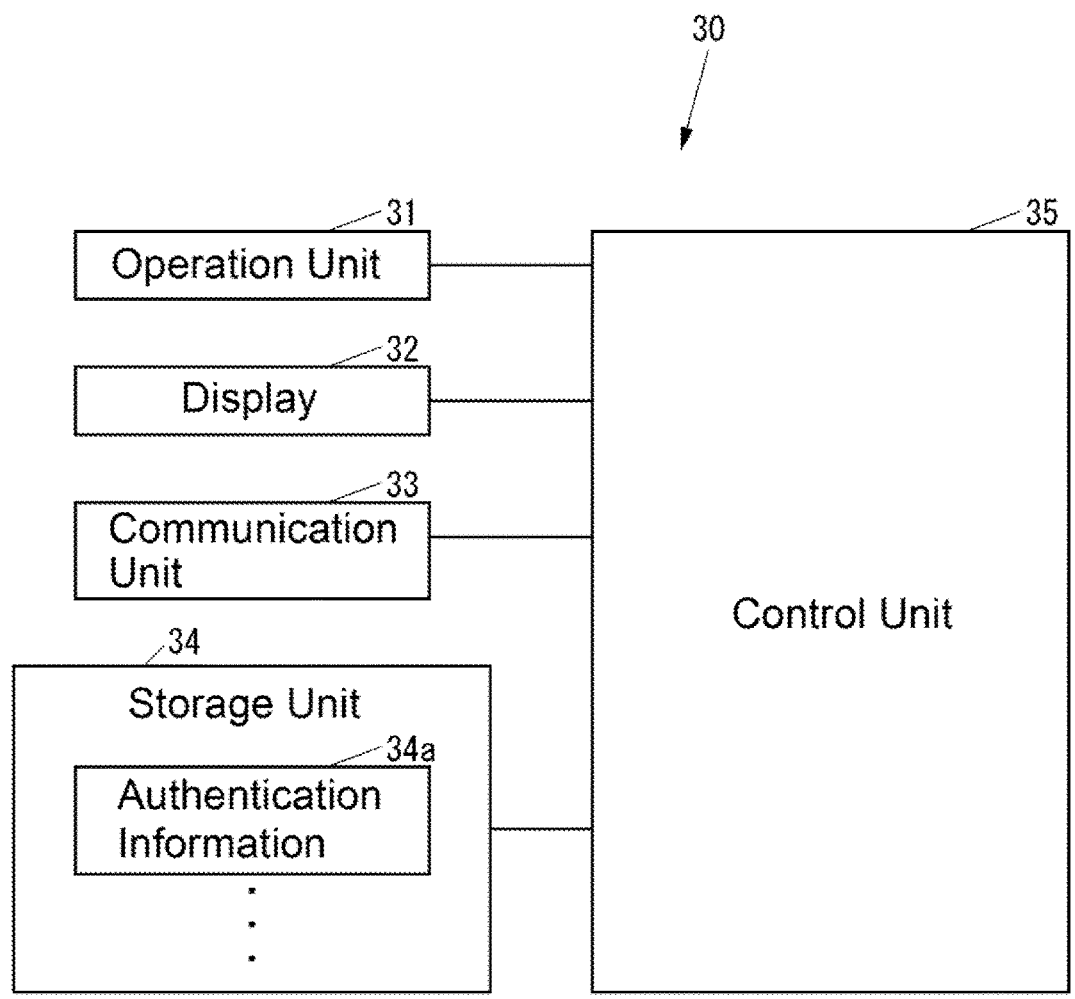
FIG. 3 illustrates a block diagram of a server according to the one embodiment.

FIG. 3 illustrates a block diagram of the server 30.

As illustrated in FIG. 3, the server 30 includes an operation unit 31, a display 32, a communication unit 33, a storage unit 34, and a control unit 35. The operation unit 31 is an input device such as a computer mouse or a keyboard with which the user inputs various kinds of operations. The display 32 is a display device such as an LCD that displays various kinds of information. The communication unit 33 is a communication device that communicates with an external device via the network 11 (see FIG. 1). The storage unit 34 is a non-volatile storage device such as a semiconductor memory or an HDD that stores various kinds of data. The control unit 35 controls the entire server 30. The server 30 is constituted of a computer such as a PC.

The storage unit 34 stores authentication information 34a to authenticate the user, such as a combination of identification information of the user (hereinafter referred to as "user identification information") and a password of the user.

The control unit 35 includes, for example, a CPU, a ROM, and a RAM. The ROM stores programs and various kinds of data. The RAM is used as a work area of the CPU. The CPU executes the programs stored in the ROM or the storage unit 34.

Figure 4:
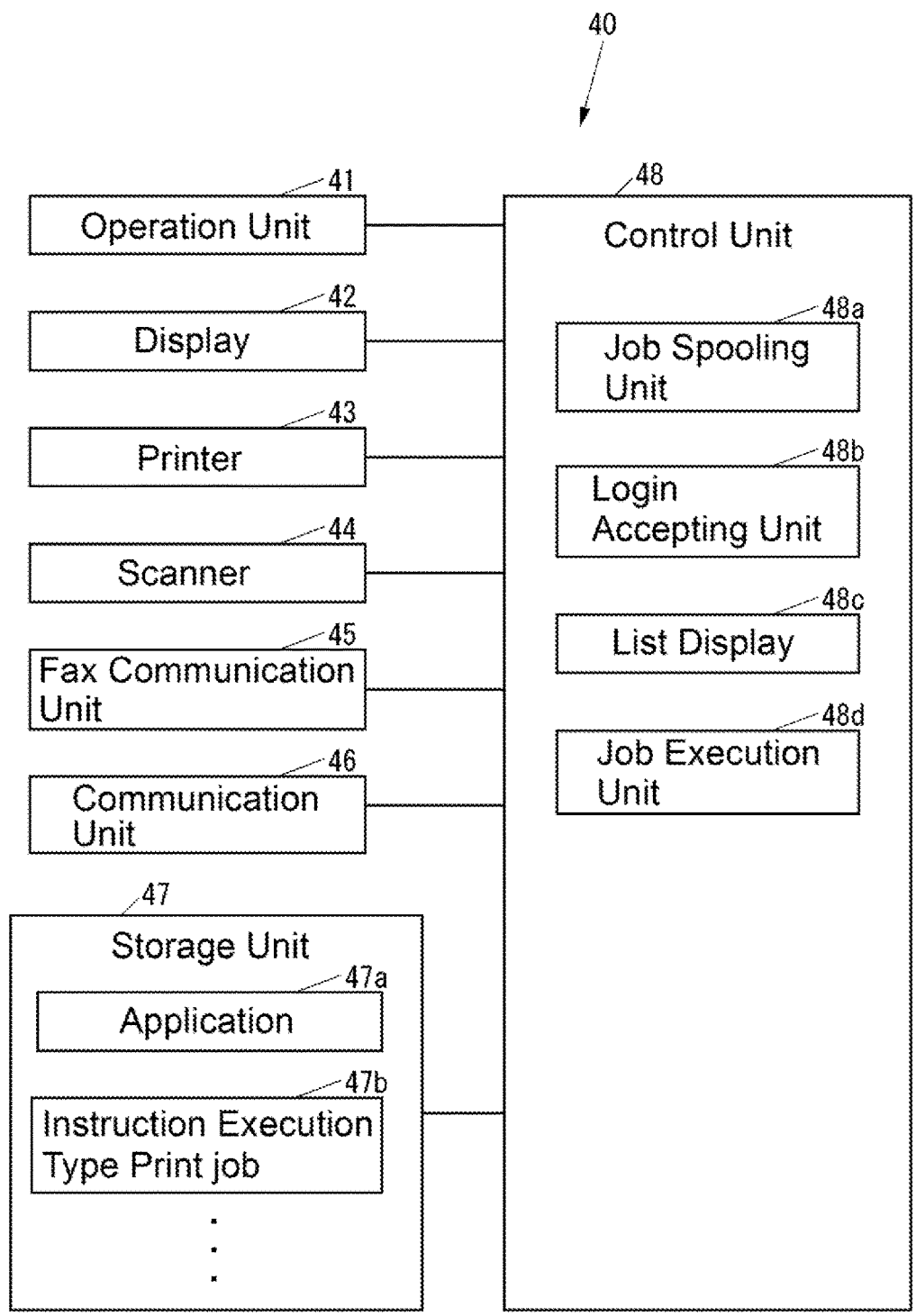
FIG. 4 illustrates a block diagram of an MFP according to the one embodiment.

FIG. 4 illustrates a block diagram of the MFP 40.

As illustrated in FIG. 4, the MFP 40 includes an operation unit 41, a display 42, a printer 43, a scanner 44, a fax communication unit 45, a communication unit 46, a storage unit 47, and a control unit 48. The operation unit 41 is an input device such as a button with which the user inputs various kinds of operations. The display 42 is a display device such as an LCD that displays various kinds of information. The printer 43 is a print device that prints on a recording medium such as a paper sheet. The scanner 44 is a reading device that reads image data from an original document. The fax communication unit 45 is a fax device that performs fax communication with an external facsimile device (not illustrated) via a communication line such as a dial-up line. The communication unit 46 is a network communication device that communicates with an external device via the network 11 (see FIG. 1). The storage unit 47 is a non-volatile storage device such as a semiconductor memory or an HDD that stores various kinds of data. The control unit 48 controls the entire MFP 40.

The storage unit 47 stores an application 47a as a Java (registered trademark) application. The application 47a constitutes a job management program of the disclosure. The application 47a may be installed in the MFP 40 at production stage of the MFP 40, may be additionally installed in the MFP 40 from an external storage medium such as an SD card or a USB memory, or may be additionally installed in the MFP 40 from the network 11. While not illustrated, the storage unit 47 also stores a Java Platform executed by the control unit 48 to execute the application 47a.

The storage unit 47 ensures storing a plurality of instruction execution type print jobs 47b. The storage unit 47 associates each of the instruction execution type print jobs 47b with any of user identification information to store the associated information.

The control unit 48 includes, for example, a CPU, a ROM, and a RAM. The ROM stores programs and various kinds of data. The RAM is used as a work area of the CPU. The CPU executes the programs stored in the ROM or the storage unit 47.

The control unit 48 executes the application 47a to function as a job spooling unit 48a, a login accepting unit 48b, a list display 48c, and a job execution unit 48d. The job spooling unit 48a user-individually spools instruction execution type print jobs as print jobs executed in response to a specific instruction for each of the users. The login accepting unit 48b accepts a login of a user. The list display 48c displays a list of the instruction execution type print jobs of the user whose login has been accepted by the login accepting unit 48b. The job execution unit 48d executes the instruction execution type print job designated from the list displayed by the list display 48c.

Next, the following describes operations of the printing system 10.

First, the following describes operations of the user terminal 20 when transmitting a print job.

Figure 5:
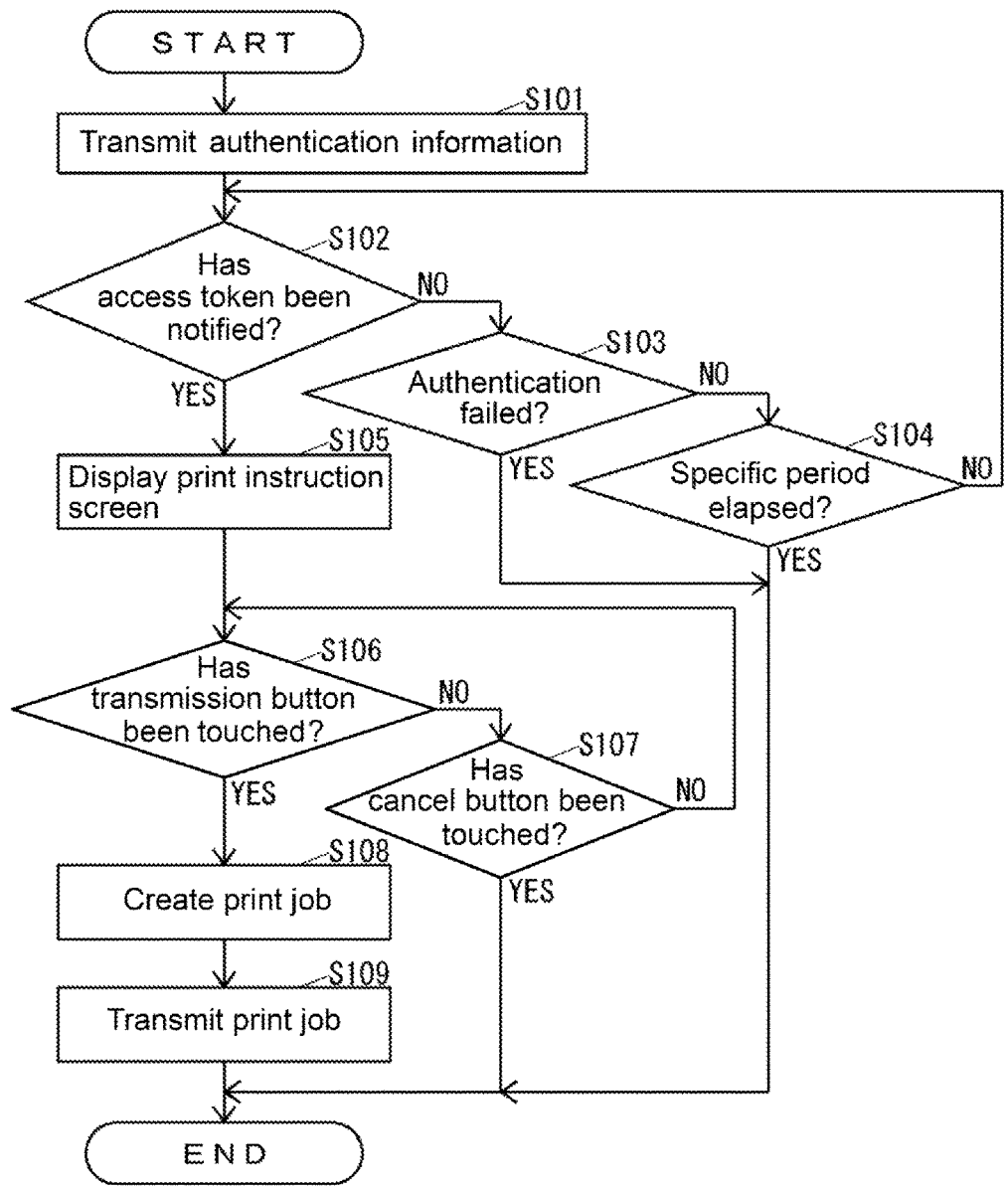
FIG. 5 illustrates operations of the user terminal according to the one embodiment when transmitting a print job.

FIG. 5 illustrates the operations of the user terminal 20 when transmitting the print job.

When an instruction displayed in a print instruction screen is received via the operation unit 21, the control unit 25 of the user terminal 20 executes the printer driver 24a to execute the operations illustrated in FIG. 5.

As illustrated in FIG. 5, the control unit 25 transmits the authentication information received via the operation unit 21 to the server 30 (Step S101). Here, the authentication information may be input via the operation unit 21 before the operations illustrated in FIG. 5 or may be input at Step S101. Thus, when the storage unit 34 stores the authentication information 34a identical to the authentication information transmitted from the user terminal 20, the control unit 35 of the server 30 permits a login of a user to return an access token indicating the permitted login to the user terminal 20.

After the process of Step S101, the control unit 25 of the user terminal 20 determines whether the access token of the user has been notified from the server 30 or not (Step S102).

When the control unit 25 determines that the access token of the user has not been notified from the server 30 at Step S102, the control unit 25 determines whether a failure of authentication has been notified from the server 30 or not (Step S103).

When the control unit 25 determines that the failure of the authentication has been notified from the server 30 at Step S103, the control unit 25 terminates the operations illustrated in FIG. 5.

When the control unit 25 determines that the failure of the authentication has not been notified from the server 30 at Step S103, the control unit 25 determines whether a specific period has elapsed after the process of Step S101 or not (Step S104).

When the control unit 25 determines that the specific period has elapsed at Step S104, the control unit 25 terminates the operations illustrated in FIG. 5.

When the control unit 25 determines that the specific period has not elapsed at Step S104, the control unit 25 executes the process of Step S102.

When the control unit 25 determines that the access token of the user has been notified from the server 30 at Step S102, the control unit 25 displays a print instruction screen 70 (see FIG. 6) at Step S105.

Figure 6:
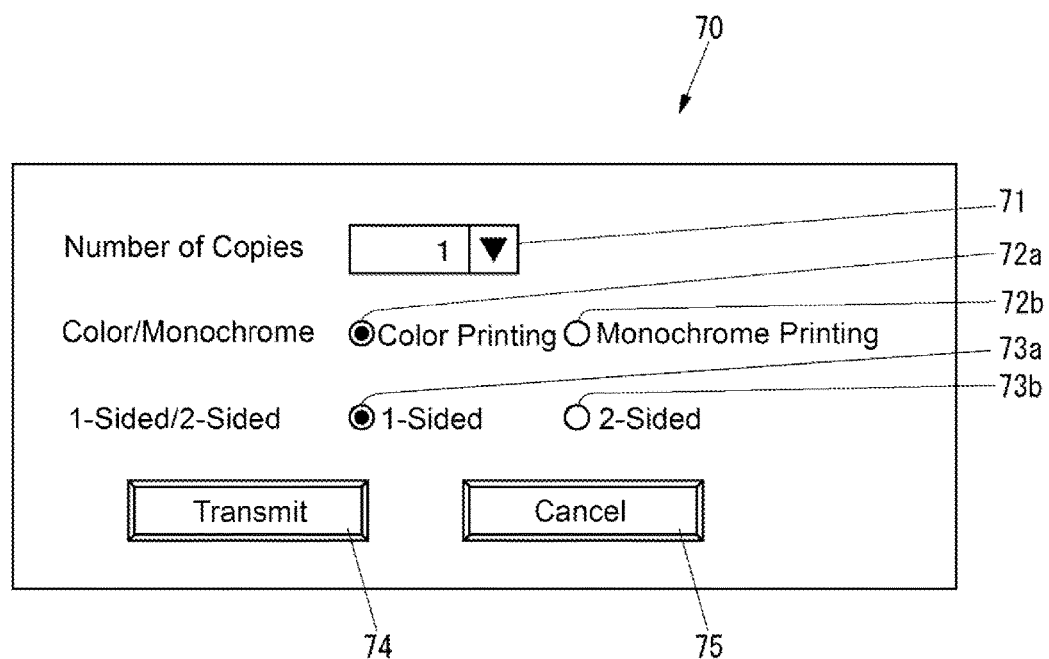
FIG. 6 illustrates an example of a print instruction screen displayed during the operations illustrated in FIG. 5.

The print instruction screen 70 illustrated in FIG. 6 includes a pull-down menu 71, radio buttons 72a and 72b, radio buttons 73a and 73b, a transmission button 74, and a cancel button 75. The pull-down menu 71 is a menu for specifying the number of copies to be printed. The radio buttons 72a and 72b are buttons for specifying any of color printing and monochrome printing. The radio buttons 73a and 73b are buttons for specifying any of single-side printing and duplex printing. The transmission button 74 is a button for executing a transmission of an instruction execution type print job. The cancel button 75 is a button for terminating the operations illustrated in FIG. 5. Note that a print setting is not limited to the above-described settings and may include various kinds of settings. For example, aggregate print may be configured to be settable as the print setting.

As illustrated in FIG. 5, after the process of Step S105, the control unit 25 determines whether the transmission button 74 has been touched or not (Step S106).

When the control unit 25 determines that the transmission button 74 has not been touched At Step S106, the control unit 25 determines whether the cancel button 75 has been touched or not (Step S107).

When the control unit 25 determines that the cancel button 75 has been touched at Step S107, the control unit 25 terminates the operations illustrated in FIG. 5.

When the control unit 25 determines that the cancel button 75 has not been touched at Step S107, the control unit 25 executes the process of Step S106.

When the control unit 25 determines that the transmission button 74 has been touched at Step S106, the control unit 25 creates a print job corresponding to settings on the print instruction screen 70 (Step S108), transmits the print job created at Step S108 to a transmission destination (Step S109), and terminates the operations illustrated in FIG. 5. The transmission destination can be specified on the print instruction screen 70 or can be set before the operations illustrated in FIG. 5.

When a port number for an instruction execution type print job in the MFP 40, 50, or 60 as the transmission destination is designated, the control unit 25 transmits the print job as an instruction execution type print job. Here, the control unit 25 writes the user identification information and the access token of the logged-in user using printer job language (PJL) on a header of data of the instruction execution type print job. Thus, after confirming that the login is not an unauthorized access on the basis of the access token transmitted from the user terminal 20, the job spooling unit 48a of the MFP 40 associates the instruction execution type print job transmitted from the user terminal 20 as the instruction execution type print job 47b with the user identification information transmitted from the user terminal 20 to store (spool) it in the storage unit 47. When the job spooling unit 48a cannot confirm that the login is an authorized access on the basis of the access token transmitted from the user terminal 20, the job spooling unit 48a does not spool and discards the instruction execution type print job transmitted from the user terminal 20.

When a port number for an ordinary print job in the MFP 40, 50, or 60 as the transmission destination is designated, the control unit 25 transmits a print job as an ordinary print job.

Next, the following describes operations of the MFP 40 when an instruction execution type print job is executed.

Figure 7:
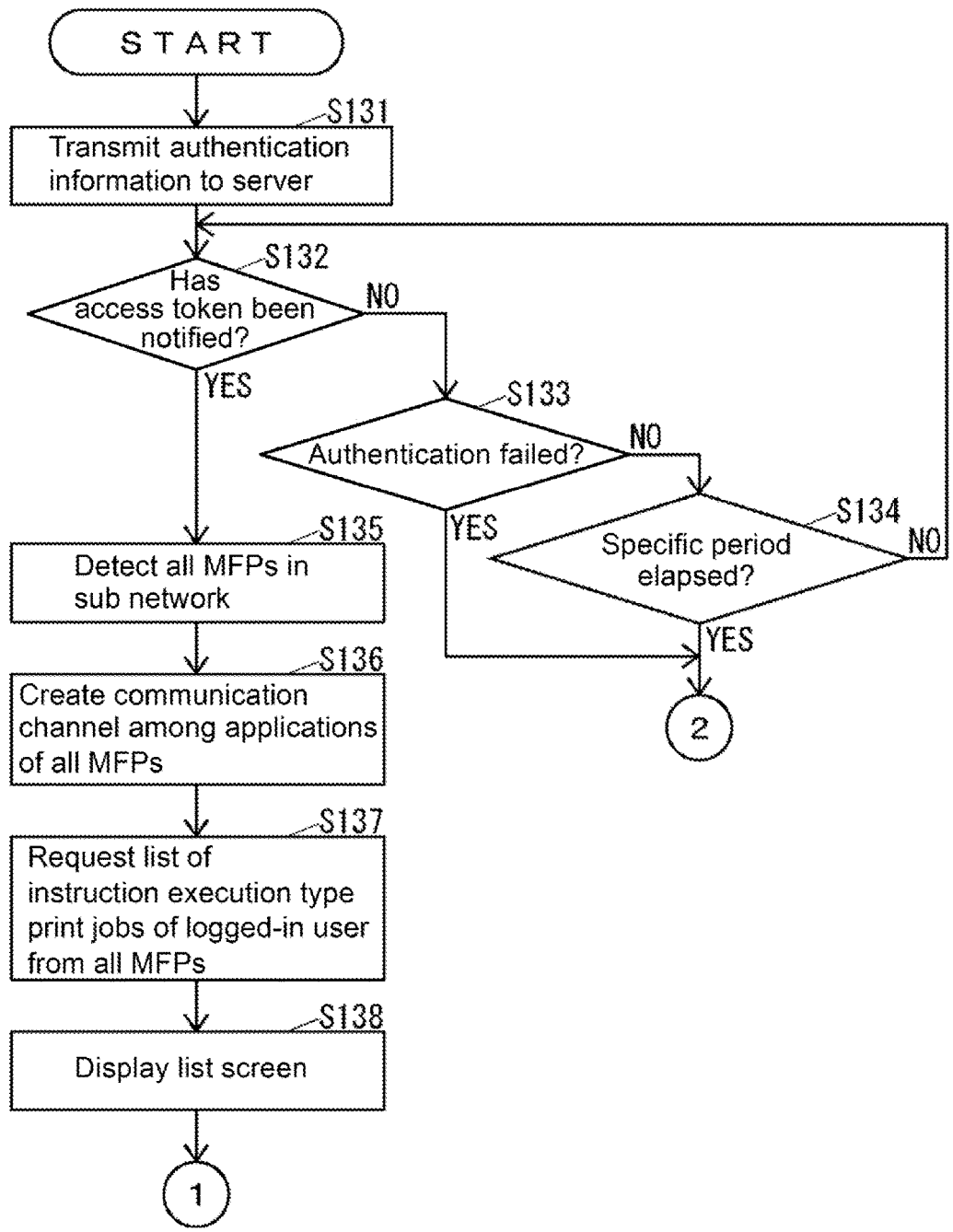
FIG. 7 illustrates a part of operations of the MFP according to the one embodiment when executing an instruction execution type print job.
Figure 8:
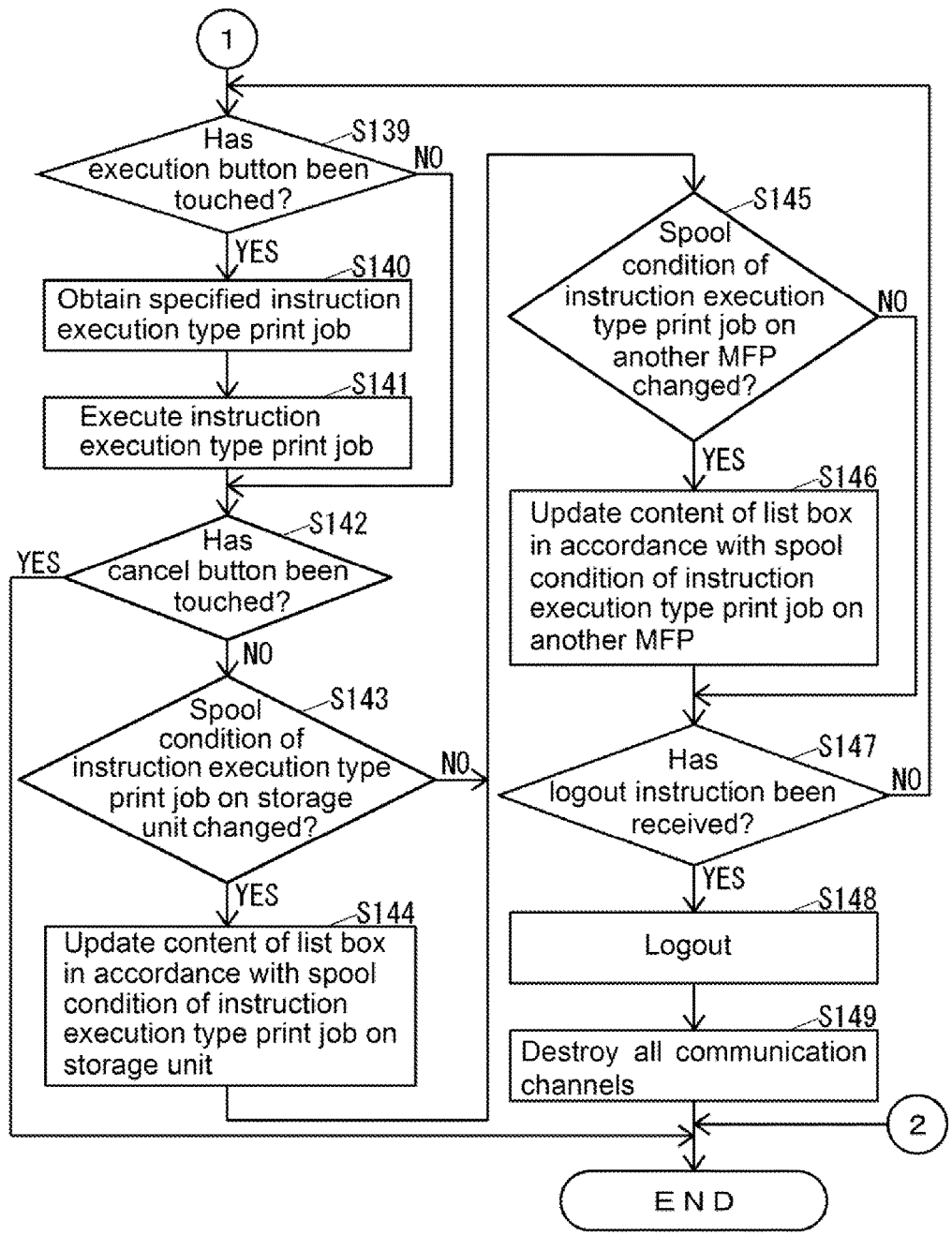
FIG. 8 illustrates a part of operations of the MFP according to the one embodiment when executing an instruction execution type print job, which is different from the part illustrated in FIG. 7.

FIGS. 7 and 8 illustrate the operations of the MFP 40 when executing the instruction execution type print job.

When an instruction displayed in a list screen is received via the operation unit 41, the control unit 48 of the MFP 40 executes the operations illustrated in FIGS. 7 and 8.

As illustrated in FIGS. 7 and 8, the login accepting unit 48b of the control unit 48 transmits the authentication information received via the operation unit 41 to the server 30 (Step S131). Here, the authentication information may be input via the operation unit 41 before the operations illustrated in FIGS. 7 and 8 or may be input at Step S131. Thus, when the storage unit 34 stores the authentication information 34a identical to the authentication information transmitted from the MFP 40, the control unit 35 of the server 30 permits a login of a user and returns an access token indicating the permitted login to the MFP 40.

After the process of Step S131, the login accepting unit 48b of the MFP 40 determines whether the access token of the user has been notified from the server 30 or not (Step S132).

When the login accepting unit 48b determines that the access token of the user has been notified from the server 30 at Step S132, the login accepting unit 48b determines whether a failure of authentication has been notified from the server 30 or not (Step S133).

When the login accepting unit 48b determines that the failure of the authentication has been notified from the server 30 at Step S133, the login accepting unit 48b terminates the operations illustrated in FIGS. 7 and 8.

When the login accepting unit 48b determines that the failure of the authentication has not been notified from the server 30 at Step S133, the login accepting unit 48b determines whether a specific period has elapsed after the process of Step S131 or not (Step S134).

When the login accepting unit 48b determines that the specific period has elapsed at Step S134, the login accepting unit 48b terminates the operations illustrated in FIGS. 7 and 8.

When the login accepting unit 48b determines that the specific period has not elapsed at Step S134, the login accepting unit 48b executes the process of Step S132.

When the access token of the user is determined to be notified from the server 30 at Step S132, the list display 48c detects all the MFPs in a sub network using broadcast (Step S135) to create or open communication channels (streams) associated with identification information of the logged-in user to applications of all the MFPs detected at Step S135 (Step S136). That is, the applications of other MFPs receive identification information of the user who logs in the MFP 40 from this MFP 40. These communication channels ensure the maintained connections until an explicit disconnection.

After the process of Step S136, the list display 48c requests a list of instruction execution type print jobs of the user who logs in the MFP 40 among the instruction execution type print jobs spooled by the respective MFPs from all the MFPs connected via the communication channels opened at Step S136 (Step S137). Thus, the list displays of the respective MFPs return the list of the instruction execution type print jobs of the user who logs in the MFP 40 among the instruction execution type print jobs spooled by their own MFPs via the communication channels opened at Step S136.

After the process of Step S137, the list display 48c displays a list screen 80 (see FIG. 9) into which the list of the instruction execution type print jobs 47b of the user who logs in the MFP 40 among the instruction execution type print jobs 47b spooled in the storage unit 47, and the lists received from the respective MFPs are combined on the display 42 (Step S138).

Figure 9:
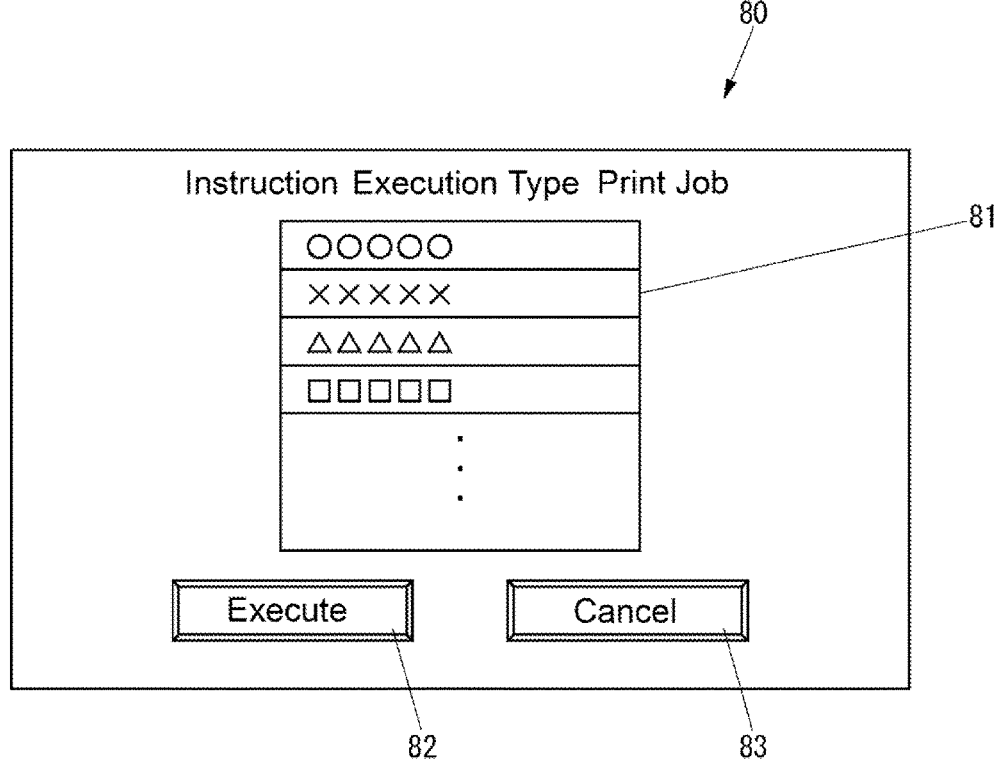
FIG. 9 illustrates an example of a list screen displayed during the operations illustrated in FIG. 7.

The list screen 80 illustrated in FIG. 9 includes a list box 81, an execution button 82, and a cancel button 83. The list box 81 displays the list of the instruction execution type print jobs of the user who logs in the MFP 40. The execution button 82 is a button for executing the instruction execution type print job designated in the list box 81. The cancel button 83 is a button for terminating the operations illustrated in FIGS. 7 and 8.

After the process of Step S138, the job execution unit 48d determines whether the execution button 82 has been touched or not (Step S139).

When the job execution unit 48d determines that the execution button 82 has been touched at Step S139, the job execution unit 48d obtains the instruction execution type print job designated in the list box 81 (Step S140). Here, when the instruction execution type print job designated in the list box 81 is spooled by another MFP, the job execution unit 48d obtains this instruction execution type print job from the other MFP. When the instruction execution type print job designated in the list box 81 is spooled by the MFP 40, the job execution unit 48d obtains this instruction execution type print job from the storage unit 47.

After the process of Step S140, the control unit 48 causes the printer 43 to execute the instruction execution type print job obtained at Step S140 (Step S141).

When the execution button 82 is determined to be untouched at Step S139, or when the process of Step S141 is executed, the list display 48c determines whether the cancel button 83 has been touched or not (Step S142).

When the list display 48c determines that the cancel button 83 has been touched at Step S142, the list display 48c terminates the operations illustrated in FIGS. 7 and 8.

When the list display 48c determines that the cancel button 83 has not been touched at Step S142, the list display 48c determines whether, among the instruction execution type print jobs 47b on the storage unit 47, a spool condition of the instruction execution type print job 47b of the user who logs in the MFP 40 has changed, that is, the number of the instruction execution type print jobs 47b of the user who logs in the MFP 40 has changed or not (Step S143). Here, the control unit 25 of the user terminal 20 ensures transmitting the instruction execution type print job to the MFP 40 by the operations illustrated in FIG. 5. The operations illustrated in FIG. 5 are executable at any timing.

When the list display 48c determines that the spool condition of the instruction execution type print job 47b of the user who logs in the MFP 40 has changed at Step S143, the list display 48c updates a content of the list box 81 in accordance with the spool condition of the instruction execution type print job 47b of the user who logs in the MFP 40 (Step S144).

When the list display 48c determines that the spool condition of the instruction execution type print job 47b of the user who logs in the MFP 40 has not changed at Step S143, or when the list display 48c executes the process of Step S144, the list display 48c determines whether the spool condition of the instruction execution type print job of the user who logs in the MFP 40 has been notified from another MFP or not (Step S145). Here, the control unit 25 of the user terminal 20 ensures transmitting the instruction execution type print job to any of the MFP by the operations illustrated in FIG. 5. The operations illustrated in FIG. 5 are executable at any timing. Among the instruction execution type print jobs spooled by their own MFPs, when a spool condition of the instruction execution type print job of the user who logs in the MFP 40 has changed, that is, when the number of the instruction execution type print jobs of the user who logs in the MFP 40 has increased or decreased, the list displays of the respective MFPs notify the spool condition of the instruction execution type print job of the user who logs in the MFP 40 via the communication channels opened at Step S136.

When the list display 48c determines that the spool condition of the instruction execution type print job of the user who logs in the MFP 40 has been notified from another MFP at Step S145, the list display 48c updates the content of the list box 81 in accordance with the spool condition notified by the other MFP (Step S146).

When the list display 48c determines that the spool condition of the instruction execution type print job of the user who logs in the MFP 40 has not been notified from the other MFP at Step S145, or when the process of Step S146 is executed, the login accepting unit 48b determines whether a logout instruction has been input via the operation unit 41 or not (Step S147).

When the login accepting unit 48b determines that the logout instruction has not been received at Step S147, the job execution unit 48d executes the process of Step S139.

When the login accepting unit 48b determines that the logout instruction has been input at Step S147, the login accepting unit 48b causes the user who logs in the MFP 40 to log out (Step S148). After discarding all the communication channels opened at Step S136 (Step S149), the login accepting unit 48b terminates the operations illustrated in FIGS. 7 and 8.

The above has described the execution of the instruction execution type print job. However, the printing system 10 accepts also an execution of an ordinary print job, which is not an instruction execution type print job. That is, when the user terminal 20 transmits an ordinary print job to the MFP 40, the MFP 40 does not spool this print job as the instruction execution type print job 47b in the storage unit 47, and the printer 43 executes it.

As described above, in the printing system 10, when the MFPs 40, 50, and 60 each receive the user identification information of a user whose login has been accepted by another MFP from this MFP (Step S136), and when a spool condition of an instruction execution type print job of this user has changed (YES at Step S145), the MFPs 40, 50, and 60 each transmit this condition to this MFP. Thus, when a user logs in one MFP and another MFP spools an instruction execution type print job of this user, the printing system 10 enables the user to appropriately recognize this instruction execution type print job.

When the user logs in the one MFP, the printing system 10 opens a communication channel between this MFP and another MFP (Step S136) and notifies the one MFP of a spool condition of the other MFP via the communication channel. This enables the user to more appropriately recognize also the print job spooled in any MFP.

When the user logs in the one MFP, the printing system 10 enables the one MFP to execute the instruction execution type print job spooled by the other MFP (Step S141).

While the print apparatus of the disclosure is an MFP in the embodiment, a print apparatus other than an MFP, such as a printer-only machine, may be employed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A printing system comprising:
    a plurality of print apparatuses; and
    the plurality of print apparatuses each including
        a central processing unit (CPU),
        a storage device storing a job management program, and
        a display; wherein
    the CPU executes the job management program to function as
        a job spooling unit that spools in the storage device, an instruction execution type print job as a print job executed in response to a specific instruction for each of users,
        a login accepting unit that accepts a login of a user,
        a list display that displays a list of instruction execution type print jobs for a logged-in user, and
        a job execution unit that executes the instruction execution type print job designated in the list; and
    the list display
        (i) when the login of the user has been accepted by the login accepting unit, opens a communication channel associated with identification information for the logged-in user, with another of the plurality of print apparatuses,
        (ii) transmits the identification information for the logged-in user to the other of the plurality of print apparatuses via the communication channel,
        (iii) requests to the other of the plurality of print apparatuses, a first list of the instruction execution type print jobs of the logged-in user among the instruction execution type print jobs spooled in the other of the plurality of print apparatuses,
        (iv) displays a list screen into which a second list of the instruction execution type print jobs of the logged-in user among the instruction execution type print jobs spooled in the storage device and the first list received from the other of the plurality of print apparatuses are combined on the display,
        (v) is notified of status change of spooling of the logged-in user's instruction execution type print job from the other of the plurality of print apparatuses, when the status change of spooling of the logged-in user's instruction execution type print job has occurred in the other of the plurality of print apparatuses, and
        (vi) updates the list screen displayed on the display.

2. The printing system according to claim 1, wherein the status change of spooling of the logged-in user's instruction execution type print job includes a changed count of the instruction execution type print jobs.

3. The printing system according to claim 1, further comprising:
    a server that authenticates the user; and
    an electronic device that generates the print job; wherein
        the electronic device transmits authentication information input by the user to the server;
        when the server stores authentication information same as the authentication information transmitted from the electronic device, the server permits the login of the user to transmit an access token indicating the permitted login to the electronic device; and
        after the electronic device receives the access token
            when a port number for the instruction execution type print job in the print apparatus as a transmission destination is designated, the electronic device transmits the print job as the instruction execution type print job to the print apparatus, and
            when a port number for an ordinary print job in the print apparatus as the transmission destination is designated, the electronic device transmits the print job as an ordinary print job to the print apparatus.

4. The printing system according to claim 3, wherein the electronic device writes the identification information and the access token of the user using printer job language in a header of data of the instruction execution type print job.

5. The printing system according to claim 1, wherein the job execution unit:
    when the other of the plurality of print apparatuses spools the instruction execution type print job designated from the list screen, obtains the instruction execution type print job from the other of the plurality of print apparatuses and executes the print job; and
    when the print apparatus itself spools the instruction execution type print job designated from the list screen, obtains the instruction execution type print job from the storage device and executes the print job.

6. A non-transitory computer-readable recording medium storing a job management program, the job management program causing a print apparatus to function as:
    a job spooling unit that spools an instruction execution type print job as a print job executed in response to a specific instruction for each of users;
    a login accepting unit that accepts a login of a user;
    a list display that displays a list of instruction execution type print jobs for a logged-in user; and
    a job execution unit that executes the instruction execution type print job designated in the list; wherein
    the list display
        (i) when the login of the user has been accepted, opens a communication channel associated with identification information for the logged-in user, with another of the plurality of print apparatuses,
        (ii) transmits the identification information for the logged-in user to the other of the plurality of print apparatuses via the communication channel,
        (iii) requests to the other of the plurality of print apparatuses, a first list of the instruction execution type print jobs of the logged-in user among the instruction execution type print jobs spooled in the other of the plurality of print apparatuses,
        (iv) displays a list screen into which a second list of the instruction execution type print jobs of the logged-in user among the instruction execution type print jobs spooled in the storage device and the first list received from the other of the plurality of print apparatuses are combined on the display,
        (v) is notified of status change of spooling of the logged-in user's instruction execution type print job from the other of the plurality of print apparatuses, when the status change of spooling of the logged-in user's instruction execution type print job has occurred in the other of the plurality of print apparatuses, and (vi) updates the list screen displayed on a display of the print apparatus.

\* \* \* \* \*